United States Patent
Omura

(10) Patent No.: US 11,872,619 B2
(45) Date of Patent: Jan. 16, 2024

(54) METHOD FOR MANUFACTURING LAMINATED STEEL SHEET, APPARATUS FOR MANUFACTURING LAMINATED STEEL SHEET, AND CURABLE COMPOSITION USED FOR THE SAME

(71) Applicant: THREEBOND CO., LTD., Tokyo (JP)

(72) Inventor: Ai Omura, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 214 days.

(21) Appl. No.: 17/414,562

(22) PCT Filed: Dec. 12, 2019

(86) PCT No.: PCT/JP2019/048735
§ 371 (c)(1),
(2) Date: Jun. 16, 2021

(87) PCT Pub. No.: WO2020/129813
PCT Pub. Date: Jun. 25, 2020

(65) Prior Publication Data
US 2022/0055088 A1    Feb. 24, 2022

(30) Foreign Application Priority Data

Dec. 18, 2018   (JP) .................. 2018-236173

(51) Int. Cl.
| | | |
|---|---|---|
| *B21D 39/03* | (2006.01) | |
| *B21D 28/02* | (2006.01) | |
| *B21D 28/26* | (2006.01) | |
| *C09J 5/02* | (2006.01) | |
| *C09J 133/08* | (2006.01) | |
| *C09J 135/02* | (2006.01) | |

(52) U.S. Cl.
CPC ............ *B21D 39/03* (2013.01); *B21D 28/02* (2013.01); *B21D 28/26* (2013.01); *C09J 5/02* (2013.01);
(Continued)

(58) Field of Classification Search
CPC ........ B21D 28/02; B21D 28/24; B21D 39/03; B21D 28/26; B26F 1/02; H01F 1/18;
(Continued)

(56) References Cited

U.S. PATENT DOCUMENTS

2008/0085985 A1*  4/2008  Nakamura ............... C08L 63/00
                                                            528/25
2013/0248100 A1*  9/2013  Peruzzi ................. B32B 15/043
                                                            156/379.7
(Continued)

FOREIGN PATENT DOCUMENTS

| DE | 102017001802 A1 | 8/2017 |
|---|---|---|
| JP | S60-40177 A | 3/1985 |

(Continued)

OTHER PUBLICATIONS

EPO, Extended European Search Report for the corresponding European patent application No. 19898919.6, dated May 17, 2022.
(Continued)

*Primary Examiner* — Sarang Afzali
*Assistant Examiner* — Darrell C Ford
(74) *Attorney, Agent, or Firm* — LUCAS & MERCANTI, LLP

(57) ABSTRACT

A method is for manufacturing a laminated steel sheet comprising laminated a predetermined number of thin steel sheets formed by punching a belt-shaped thin steel sheet into a predetermined shape. This method includes the following steps 1 to 3: step 1: a step of sequentially punching the thin steel sheet into a predetermined shape with a metallic die; step 2: a step of applying a curable composition to a predetermined portion of the thin steel sheet; and step 3: a step of irradiating the curable composition with energy rays. The curable composition is a delayed curable composition
(Continued)

which is cured after a lapse of a predetermined time after being irradiated with energy rays.

4 Claims, 1 Drawing Sheet

(52) U.S. Cl.
CPC ........... *C09J 133/08* (2013.01); *C09J 135/02* (2013.01); *C09J 2400/166* (2013.01)

(58) Field of Classification Search
CPC ......... B32B 2037/1253; B32B 2311/30; B32B 2457/00; B32B 37/12; H02K 2213/03; H02K 1/02; H02K 15/02; Y10T 29/49826; Y10T 29/49833; Y10T 29/49828; Y10T 29/49829; Y10T 29/49885; Y10T 29/49888; Y10T 29/4998; Y10T 29/49982
USPC ........... 29/428, 432, 432.1, 432.2, 458, 460, 29/527.1, 527.2
See application file for complete search history.

(56) References Cited

U.S. PATENT DOCUMENTS

| | | | |
|---|---|---|---|
| 2017/0250581 A1* | 8/2017 | Bauer | ........................ H02K 1/28 |
| 2017/0297078 A1* | 10/2017 | Nishinaka | ............. B05C 5/0212 |
| 2017/0368590 A1* | 12/2017 | Senda | ................. H01F 41/0266 |
| 2018/0257360 A1* | 9/2018 | Liponkoski | .......... B27M 3/0053 |
| 2021/0287852 A1* | 9/2021 | Jung | ....................... B01J 21/066 |

FOREIGN PATENT DOCUMENTS

| | | |
|---|---|---|
| JP | 2006-334648 A | 12/2006 |
| JP | 2015-082860 A | 4/2015 |
| JP | 2017-214499 A | 12/2017 |
| JP | 2018-107852 A | 7/2018 |
| WO | 2019/123885 A1 | 6/2019 |

OTHER PUBLICATIONS

Office Action dated Nov. 1, 2022 for the corresponding Chinese patent application No. 201980077822.0, and English translation.
PCT, International Search Report for the corresponding patent application No. PCT/JP2019/048735, dated Feb. 4, 2020, with English translation.
PCT, Written Opinion of the International Searching Authority for the corresponding patent application No. PCT/JP2019/048735, dated Feb. 4, 2020 (English translation not available).
Office Action dated Jun. 25, 2023 for the corresponding Chinese patent application No. 201980077822.0, and English translation.
Office Action dated Oct. 10, 2023 for the corresponding Japanese Patent Application No. 2020-561361, and English translation.
Office Action dated Nov. 6, 2023, for the corresponding Chinese Application No. 201980077822.0, with English translation.

* cited by examiner

[FIG. 1]
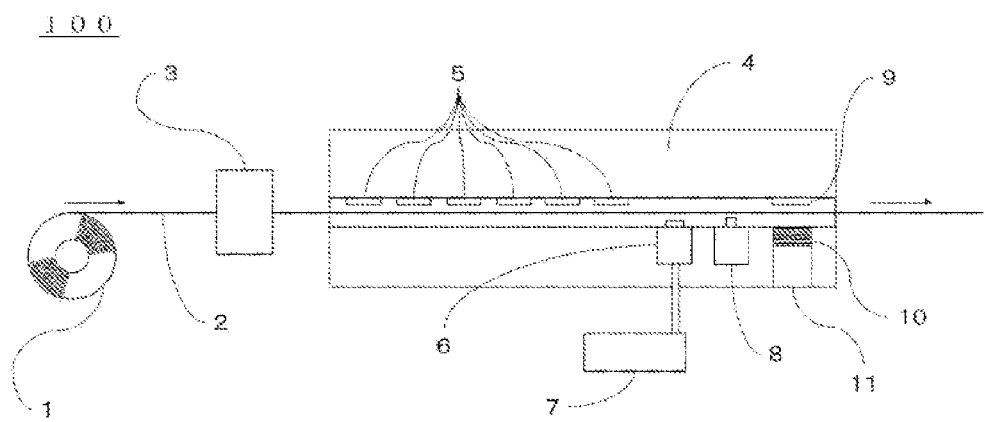
[FIG. 2]
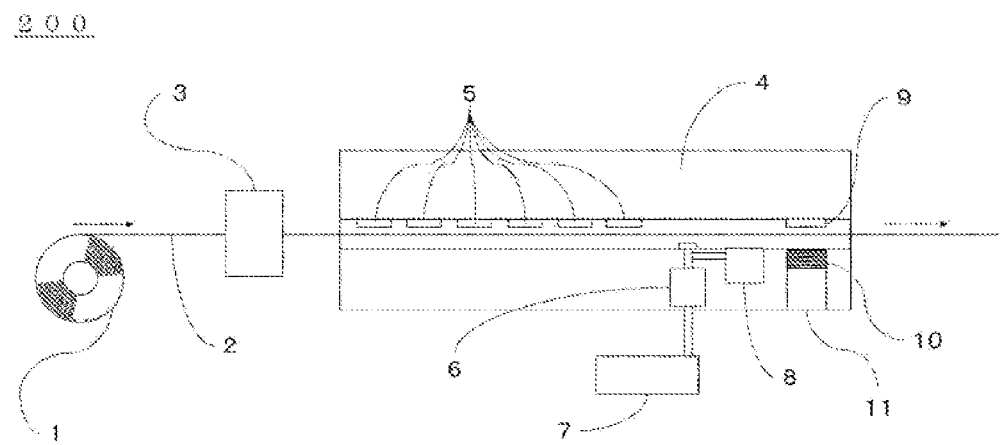

METHOD FOR MANUFACTURING LAMINATED STEEL SHEET, APPARATUS FOR MANUFACTURING LAMINATED STEEL SHEET, AND CURABLE COMPOSITION USED FOR THE SAME

CROSS REFERENCE TO RELATED APPLICATION

This Application is a 371 of PCT/JP2019/048735 filed on Dec. 12, 2019 which, in turn, claimed the priority of Japanese Patent Application No. 2018-236173 filed on Dec. 18, 2018, both applications are incorporated herein by reference.

TECHNICAL FIELD

The present invention relates to a method for manufacturing a laminated steel sheet, an apparatus for manufacturing a laminated steel sheet, and a curable composition having a delayed curability used for the same.

BACKGROUND ART

In a manufacturing process of a laminated steel sheet, it has been known that the laminated steel sheet is manufactured by applying an adhesive between the thin steel sheets to form a laminated body. An epoxy resin composition, a (meth)acrylic resin composition, or the like has been used as the adhesive, to perform heat curing or anaerobic curing. However, since it takes time to cure, the production efficiency of the laminated steel sheet is low, and there is a risk that the thin steel sheets will peel off after manufacturing. In order to solve this problem, an attempt has been made in JP 2006-334648 A to add a curing accelerator to a processing oil to accelerate the curing; however, it is difficult to control a curing state by using two kinds of resin compositions, an adhesive and a curing accelerator, in a state where the processing oil is mixed.

SUMMARY OF INVENTION

It has been conventionally difficult to bring an adhesive between thin steel sheets into a stable cured state after a lapse of a predetermined time.

As a result of diligent studies to achieve the above object, the present inventor has found a method for manufacturing a laminated steel sheet, an apparatus for manufacturing a laminated steel sheet, and a method for a curable composition used therefor, and thus has completed the present invention.

The content of the present invention will be described below. A first embodiment of the present invention relates to a method for producing a laminated steel sheet comprising a predetermined number of thin steel sheets formed by punching a belt-shaped thin steel sheet into a predetermined shape laminated, the method for producing a laminated steel sheet including the following steps 1 to 3:
  step 1: a step of sequentially punching the thin steel sheet into a predetermined shape with a metallic die;
  step 2: a step of applying a curable composition to a predetermined portion of the thin steel sheet; and
  step 3: a step of irradiating the curable composition with energy rays, wherein the curable composition is a delayed curable composition which is cured after a lapse of a predetermined time after being irradiated with energy rays.

A second embodiment of the present invention relates to the method for producing a laminated steel sheet according to the first embodiment, further including the following step 4: a step of fixing the laminated thin steel sheets for a predetermined time.

A third embodiment of the present invention relates to a method for producing a laminated steel sheet comprising laminated a predetermined number of thin steel sheets formed by punching a belt-shaped thin steel sheet into a predetermined shape, the method for producing a laminated steel sheet including the following steps 1 to 4 in this order:
  step 1: a step of sequentially punching the thin steel sheet into a predetermined shape with a metallic die;
  step 2: a step of applying a curable composition to a predetermined portion of the thin steel sheet;
  step 3: a step of irradiating the curable composition with energy rays; and
  step 4: a step of fixing the laminated thin steel sheets for a predetermined time, wherein the curable composition is a curable composition having delayed curability in which a curable composition is cured after a lapse of a predetermined time after being irradiated with energy rays.

A fourth embodiment of the present invention relates to the method for producing a laminated steel sheet according to any one of the first to third embodiments, wherein the step 2 is a step of applying the curable composition from the opposite side of the metallic die relative to the belt-shaped thin steel sheet.

A fifth embodiment of the present invention relates to the method for producing a laminated steel sheet according to any one of the first to fourth embodiments in which the curable composition comprises the following components (A) to (C):
  component (A): a compound having a (meth)acryloyl group;
  component (B): an anaerobic curable catalyst; and
  component (C): a photoacid generator.

A sixth embodiment of the present invention relates to a production apparatus for performing the method for producing a laminated steel sheet according to any one of the first to fifth embodiments.

A seventh embodiment of the present invention relates to a curable composition used in the method for producing a laminated steel sheet according to any one of the first to fifth embodiments, which contains the following components (A) to (C):
  component (A): a compound having a (meth)acryloyl group;
  component (B): an anaerobic curable catalyst; and
  component (C): a photoacid generator.

BRIEF DESCRIPTION OF DRAWINGS

FIG. 1 shows an example of an apparatus for manufacturing a laminated steel sheet according to the present invention, which is an apparatus for irradiating a coating with energy rays after applying a curable composition.

FIG. 2 shows another example of an apparatus for manufacturing a laminated steel sheet according to the present invention, which is an apparatus for applying a curable composition after irradiating the curable composition with energy rays.

DESCRIPTION OF EMBODIMENTS

The present invention will be described in detail below. As described in the first to fifth embodiments, the present invention is to provide a method for manufacturing a laminated steel sheet obtained by laminating a predetermined number of thin steel sheets which is formed by punching out a belt-shaped thin steel sheet into a predetermined shape, the method for manufacturing a laminated steel sheet including the following steps 1 to 3, wherein a curable composition is a curable composition having delayed curability in which the curable composition is cured after a lapse of a predetermined time after being irradiated with energy rays. Further, the method may further include a step 4. Further, as described in the sixth embodiment, the present invention is to provide a manufacturing apparatus for performing the method for manufacturing a laminated steel sheet of the present invention. Hereinafter, an apparatus for manufacturing a laminated steel sheet and a method for manufacturing a laminated steel sheet using the same will be described along with the manufacturing process;

step 1: a step of sequentially punching the thin steel sheet into a predetermined shape with a metallic die;
step 2: a step of applying the curable composition to a predetermined portion of the thin steel sheet;
step 3: a step of irradiating the curable composition with energy rays;
step 4: a step of fixing the laminated thin steel sheets for a predetermined time.

The present invention relates to a method for manufacturing a laminated steel sheet using a curable composition having delayed curability, in which the curable composition is cured after a lapse of a predetermined time after being irradiated with energy rays, and the curable composition, which is an adhesive between thin steel sheets can be brought into a stable cured state in a short time to stably manufacture a laminated steel sheet.

As one embodiment of the present invention, an apparatus for manufacturing a laminated steel sheet as illustrated in FIG. 1 can be mentioned. In an apparatus for manufacturing a laminated steel sheet 100 in FIG. 1, a belt-shaped thin steel sheet 2 is supplied from a roll device 1 to a metallic die machine 4. Next, a step of applying a processing oil to the belt-shaped thin steel sheet 2 with a processing oil applicator 3 is performed, and then, in the metallic die machine 4, steps including a step of sequentially punching the belt-shaped thin steel sheet 2 coated with the processing oil into a predetermined shape with a punch portion 5, a step of applying a curable composition thereto, and a step of irradiating the curable composition with energy rays are performed. In some cases, a step of fixing the laminated thin steel sheets for a predetermined time is also included.

In the apparatus for manufacturing the laminated steel sheet 100 as illustrated in FIG. 1, the punch portion 5 is provided on the upper side of the metallic die machine 4, and is attached directly above a transport path of the belt-shaped thin steel sheet 2, and is disposed so that the belt-shaped thin steel sheet 2 can be punched out by punching. The punch portion 5 that can be used in the present invention is a metallic die for sequentially punching the belt-shaped thin steel sheet 2 into a predetermined shape therewith. The punch portion 5 may be of one type or a combination of two or more types depending on the purpose. The punch portion 5 preferably comprises a plurality of punch portions in view of improved punching accuracy. While the belt-shaped thin steel sheet 2 is intermittently transported in the metallic die machine 4, the thin steel sheet is subjected to punching for locating holes, punching for a central hole and a small hole for outer teeth, punching for slots, punching for a final central hole, and punching for internal teeth in a sequential manner, and the like, for example. A thickness of the belt-shaped thin steel sheet 2 is preferably in the range of 0.05 to 5.0 mm, and more preferably 0.1 to 3 mm, from the viewpoint of punching processability. Finally, as it is punched out by a blanking punch portion 9, a laminate of the thin steel sheets is gradually formed in a punched hole 11, and the laminate itself descends in the punched hole 11, and falls to manufacture a laminated steel sheet 10.

In the apparatus for manufacturing a laminated steel sheet 100 illustrated in FIG. 1, a processing oil applicator 3 is provided in the middle of a delivery path (transport path) of the belt-shaped thin steel sheet 2 on the upstream side of the metallic die machine 4, and is disposed so that processing oil can be applied to the upper surface side (the surface side where the punch portion 5 hits when punching) of the belt-shaped thin steel sheet 2. However, the processing oil applicator 3 may be provided on the upstream side of the punch portion 5, and may be provided in the metallic die machine 4. The processing oil applicator 3 that can be used in the present invention only needs to be able to apply the processing oil to the upper surface side of the belt-shaped thin steel sheet 2. The applying method is not particularly limited, and examples thereof include, but are not limited to, roller, dispensing, spray, ink jet, dipping, and the like.

The processing oil that can be used in the present invention is used for the purpose of preventing excessive friction or seizing, and is used as a punching oil. Components of the oil are not particularly limited, and examples thereof include those having a mineral oil or a synthetic oil as a main component. Specifically, it comprises a base oil such as mineral oil (light oil or the like) or synthetic oil, and an additive such as an extreme pressure additive, a anti-rust agent, or an anti-corrosion agent. For example, the extreme pressure additive is a compound containing sulfur, phosphorus, or the like and reacting with a metal under a high temperature created by an extreme pressure to produce a film of a soft metallic compound on the friction surface, and the presence of such a film between the punch portion 5 and the thin steel sheet (belt-shaped thin steel sheet 2) prevents excessive friction or seizing.

In the apparatus for manufacturing a laminated steel sheet 100 illustrated in FIG. 1, a curable composition applicator 6 is attached to the lower side of the metallic die machine 4 and to the downstream side of the punch portion 5. The applied portion (tip portion) of the curable composition applicator 6 is directly below the transport path of the belt-shaped thin steel sheet 2 and is provided so that the curable composition can be applied to a predetermined portion on the lower surface side of the belt-shaped thin steel sheet 2 (a back surface side where the punch portion 5 does not hit when punching). The curable composition applicator 6 that can be used in the present invention only needs to be able to apply the curable composition to a predetermined portion of the belt-shaped thin steel sheet 2. Here, the predetermined portion may be a specific region of the thin steel sheet or an entire passage region of the belt-shaped thin steel sheet 2. A thickness of coating in uncured state can be used as long as it is 0.01 to 100 μm. An applying method is not particularly limited, and examples thereof include, but are not limited to, roller, dispensing, spray, ink jet, dipping, and the like. In relation to the processing oil, it is preferable to apply the curable composition thereto from the opposite side (the back surface side where the punch portion 5 does not hit when punching) of the metallic die (punch portion 5) side relative to the belt-shaped thin steel sheet 2.

In the apparatus for manufacturing a laminated steel sheet 100 illustrated in FIG. 1, a curable composition supply device 7 is provided on the lower side of the metallic die machine 4. Further, the curable composition supply device 7 is connected by a connecting pipe (pipe) and the like provided with an on-off valve, a flow rate adjusting valve, a pump, a syringe, and the like as appropriate so that the curable composition can be supplied to the curable composition applicator 6. As illustrated in FIG. 1, the main body of the curable composition supply device 7 is configured to be installed below the lower portion (at a different place) of the metallic die machine 4, and a connecting pipe is disposed in the lower portion of the metallic die machine 4. Here, the main body of the curable composition supply device 7 may also be provided in the lower portion of the metallic die machine 4. The curable composition supply device 7 that can be used in the present invention only needs to be able to supply the curable composition to the curable composition applicator 6. A supply method is not particularly limited, and examples thereof include, but are not limited to, a pump, a syringe, and the like.

In the apparatus for manufacturing a laminated steel sheet 100 illustrated in FIG. 1, an irradiator 8 is installed on the lower side of the metallic die machine 4 and on the downstream side of the curable composition applicator 6. Further, a light source of the irradiator 8 is arranged so that the energy rays that activate the curable composition can be applied to a predetermined portion (specific region of thin steel sheet) on the lower surface side of the belt-shaped thin steel sheet 2 to which the curable composition is applied. The irradiator 8 that can be used in the present invention only needs to be able to irradiate energy rays such as ultraviolet rays and visible light. The energy rays serve to activate the curable composition having delayed curability described later to cure it after a predetermined time. As the light source of the irradiator 8 for irradiating energy rays, a high-pressure mercury lamp or an LED can be used. A belt conveyor type irradiator and the like equipped with a high-pressure mercury lamp can be used, and an integrated light intensity requires 0.01 to 60 kJ/m$^2$. An illuminance of an LED irradiator using an LED as a light source is generally 30 to 900 mW/cm$^2$, and in some cases to 300 mW/cm$^2$. An irradiation time is 0.1 to 60 seconds. When the integrated light intensity is adjusted by the illuminance and the irradiation time and a curable composition having the same delayed curability is used, a time until curing can be adjusted by changing the integrated light intensity.

As another embodiment of the present invention, an apparatus for manufacturing a laminated steel sheet as illustrated in FIG. 2 can be mentioned. An apparatus for manufacturing a laminated steel sheet 200 illustrated in FIG. 2 has the same configuration as the apparatus for manufacturing a laminated steel sheet 100 illustrated in FIG. 1, except that a flow path is provided between the main body of the curable composition applicator 6 and the applied portion (tip portion), and a head (light source) of the irradiator 8 is installed in the middle of this flow path in the apparatus for manufacturing a laminated steel sheet 100 illustrated in FIG. 1. Therefore, the apparatus for manufacturing a laminated steel sheet 200 illustrated in FIG. 2 has the same reference numerals as those in FIG. with respect to the same configuration as the apparatus for manufacturing a laminated steel sheet 100 illustrated in FIG. 1. As in the embodiment of the apparatus for manufacturing a laminated steel sheet 200 illustrated in FIG. 2, it is also possible to irradiate the curable composition with the irradiator 8 immediately before applying the curable composition to a predetermined portion on the lower surface side of the belt-shaped thin steel sheet 2 using the curable composition applicator 6, and then apply the curable composition. In this case, a flow path is provided between the main body of the curable composition applicator 6 and the applied portion (tip portion), the head (light source) of the irradiator 8 is installed in the middle of this flow path, and the curable composition passing through the flow path is activated by irradiating with energy rays. Also in the embodiment illustrated in FIG. 2, similarly to the embodiment illustrated in FIG. 1, by using a curable composition having delayed curability, in which the curable composition is cured after a lapse of a predetermined time after being irradiated with energy rays, the curable composition, which is an adhesive between thin steel sheets can be brought into a stable cured state in a short time to stably manufacture a laminated steel sheet 10.

The curable composition having delayed curability used in the present invention can be used as long as it is a composition that cures after a lapse of a predetermined time, starting from application of energy such as energy rays and heat. It is not necessary to continue applying energy until it is cured, and once energy is applied, it is cured later (hereinafter, a curable composition having delayed curability is also referred to as a delayed curable composition). Here, considering a time until the laminated steel sheet is assembled, the predetermined time elapsed is preferably 1 to 30 minutes. Further, as a curable composition having delayed curability, an epoxy resin-based composition such as JP 2011-038090 A, JP 2014-133875 A, and the like have been known. As a (meth)acrylic resin-based composition, those disclosed in JP 2017-214499 A and the like have been known. In the present invention, it is preferable to have delayed curability starting from application of energy rays.

The composition used in the manufacturing method of the present invention is preferably a delayed curable composition containing the following components (A) to (C). Further, as described in the seventh embodiment, the present invention is to provide a delayed curable composition containing the following components (A) to (C) used in the method for manufacturing a laminated steel sheet of the present invention:

component (A): a compound having a (meth)acryloyl group;
component (B): an anaerobic curable catalyst; and
component (C): a photoacid generator.

The component (A) may be a compound having a (meth)acryloyl group, and examples thereof include, but are not limited to, (meth)acrylic oligomers, (meth)acrylic monomers, (meth)acrylamide monomers, and the like. The (meth)acryloyl group is a general term for an acryloyl group or a methacrylic group.

Examples of the (meth)acrylic oligomer include an epoxy-modified (meth)acrylic oligomer, a urethane-modified (meth)acrylic oligomer, an oligomer having a main skeleton obtained by polymerizing a (meth)acrylic monomer and having a (meth)acryloyl group at the terminal of the main skeleton, and the like, but the (meth)acrylic oligomer is not limited thereto. Specific examples thereof include a so-called urethane-modified (meth)acrylic oligomer obtained by synthesizing a compound having polyfunctional isocyanate, a (meth)acryloyl group, and a hydroxyl group in polyvalent polyol. The polyvalent polyol may have various skeletons, and various skeletons such as an ethylene oxide skeleton, a polyester skeleton, a polyether skeleton, a polybutadiene skeleton, and a hydrogenated polybutadiene skeleton can be used. In addition, an epoxy-modified (meth)acrylic oligomer obtained by adding (meth)acrylic acid to a bisphenol A type epoxy resin, a bisphenol F type epoxy resin, and a phenol novolac resin, and a (meth)acrylic oligomer with alkylene oxide (meth)acrylate added to the bisphenol skeleton, and the like can also be mentioned, but it is not limited thereto. Generally, an oligomer refers to a polymer to which a relatively small number of monomers are bonded. Depending on the number of monomers, it is called a dimer, a trimer, a tetramer, and the like. In the present specification, the oligomer means a polymer that is greater than or equal to a dimer and has a weight average molecular weight of 1,000,000 or less. A polymer that is greater than or equal to a dimer and has a weight average molecular weight of 100,000 or less is preferable. The weight average molecular weight can be measured by gel permeation chromatography (GPC) using polystyrene as a standard substance.

A (meth)acrylic monomer can also be used as the component (A). For the purpose of lowering viscosity of the delayed curable composition to improve workability, the (meth)acrylic monomer can be mixed with the (meth)acrylic oligomer, or alternatively the (meth)acrylic oligomer or (meth)acrylic monomer can also be used alone. Examples of the (meth)acrylic monomer include a bifunctional monomer, a trifunctional monomer, a polyfunctional monomer, and the like, in addition to a monofunctional monomer. Particularly preferably, it is preferably a (meth)acrylic monomer having low molecular weight such as a molecular weight of less than 1000, which serves to lower viscosity upon addition, and a monofunctional monomer is particularly preferable.

Specific examples of the monofunctional monomer, but are not limited to, include lauryl (meth)acrylate, stearyl (meth)acrylate, ethyl carbitol (meth)acrylate, tetrahydrofurfuryl (meth)acrylate, caprolactone-modified tetrahydrofurfuryl (meth)acrylate, cyclohexyl (meth) acrylate, dicyclopentanyl (meth) acrylate, isobornyl (meth)acrylate, benzyl (meth)acrylate, phenyl (meth) acrylate, phenoxyethyl (meth) acrylate, phenoxydiethylene glycol (meth) acrylate, phenoxytetraethylene glycol (meth) acrylate, nonylphenoxyethyl (meth) acrylate, nonylphenoxytetraethylene glycol (meth) acrylate, methoxydiethylene glycol (meth)acrylate, ethoxydiethylene glycol (meth) acrylate, butoxyethyl (meth) acrylate, butoxytriethylene glycol (meth)acrylate, 2-ethylhexyl polyethylene glycol (meth)acrylate, 4-hydroxybutyl (meth) acrylate, nonylphenyl polypropylene glycol (meth) acrylate, methoxydipropylene glycol (meth) acrylate, 2-hydroxyethyl (meth)acrylate, 2-hydroxypropyl (meth)acrylate, glycerol (meth)acrylate, polyethylene glycol (meth)acrylate, polypropylene glycol (meth) acrylate, epichlorohydrin-modified butyl (meth) acrylate, epichlorohydrin-modified phenoxy (meth) acrylate, N,N-dimethylaminoethyl (meth) acrylate, N,N-diethylaminoethyl (meth)acrylate, and the like.

A preferable monofunctional monomer is a (meth)acrylic monomer having a hydroxyl group in the molecule and/or a (meth)acrylic monomer having a saturated alicyclic structure. Specific examples of the (meth)acrylic monomer having a hydroxyl group include, but are not limited to, 2-hydroxyethyl (meth)acrylate, 2-hydroxypropyl (meth) acrylate, 2-hydroxybutyl (meth) acrylate, 2-(meth)acryloyloxyethyl succinic acid, 2-(meth)acryloyloxyethyl hexahydrophthalic acid, 2-(meth)acryloyloxyethyl-2-hydroxypropyl phthalate, and the like. Most preferable examples include, but are not limited to, 2-hydroxypropyl methacrylate and/or 2-hydroxyethyl methacrylate. Specific examples of the (meth)acrylic monomer having a saturated alicyclic structure include, but are not limited to, isobornyl (meth) acrylate, dicyclopentanyl (meth) acrylate, cyclohexyl (meth) acrylate, adamantanyl (meth)acrylate, and the like. Most preferably, it is a (meth)acrylic monomer having an isobornyl skeleton and/or a dicyclopentanyl skeleton.

Specific examples of the bifunctional monomers include, but are not limited to, 1,3-butylene glycol di(meth)acrylate, 1,4-butylene glycol di(meth)acrylate, tricyclodecanedimethanol di(meth)acrylate, neopentyl glycol di(meth)acrylate, 1,6-hexane glycol di(meth)acrylate, ethylene glycol di(meth)acrylate, polyethylene glycol di(meth)acrylate, propylene glycol di(meth)acrylate, tripropylene glycol di(meth)acrylate, EO-modified neopentyl glycol di(meth)acrylate, propylene oxide (hereinafter, abbreviated as PO)-modified neopentyl glycol di(meth)acrylate, hydroxypybarian acid ester neopentyl glycol di(meth)acrylate, caprolactone-modified hydroxypivalic acid ester neopentyl glycol di(meth)acrylate, neopentyl glycol-modified trimethylolpropane di(meth)acrylate, stearic acid-modified pentaerythritol di(meth)acrylate, dicyclopentenyl di(meth)acrylate, EO-modified dicyclopentenyl di(meth)acrylate, diacryloyl isocyanurate, and the like.

Specific examples of the trifunctional monomer include, but are not limited to, trimethylolpropane tri(meth)acrylate, pentaerythritol tri(meth)acrylate, EO-modified trimethylolpropane tri(meth)acrylate, PO-modified trimethylolpropane tri(meth)acrylate, ECH-modified glycerol tri(meth)acrylate, tris(acryloyloxyethyl) isocyanurate, ethylene oxide-modified di(meth)acrylate of isocyanuric acid, and the like.

Specific examples of the polyfunctional monomer include, but are not limited to, ditrimethylolpropane tetra(meth)acrylate, pentaerythritol tetra(meth)acrylate, dipentaerythritol monohydroxy penta(meth)acrylate, alkyl-modified dipentaerythritol penta(meth)acrylate, dipentaerythritol hexa(meth)acrylate, caprolactone-modified dipentaerythritol hexa(meth)acrylate, and the like.

Examples of the (meth)acrylamide monomer that can be used in the present invention include, but are not limited to, dimethyl acrylamide, acryloyl morpholine, diethyl acrylamide, and the like. Diethyl acrylamide or dimethyl acrylamide is preferable in terms of price and availability. As specific examples of the component (A), DMAA (registered trademark; dimethylacrylamide), ACMO (registered trademark; acryloyl morpholine), DEAA (registered trademark; diethyl acrylamide), which are available from KJ Chemical Co., Ltd., and the like have been known, but it is not limited to these.

The component (B) is an anaerobic curable catalyst. In an anaerobic state in which the anaerobic curable catalyst is not in contact with oxygen, the metal ion(s) of the adherend and the component (B) can react to decompose organic peroxide described later to generate free radicals. In particular, the component (B) is preferably saccharin as shown in the following formula 1.

[Chemical Formula 1]

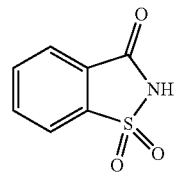

Formula 1

The component (B) is preferably added in an amount of 0.01 to 5.0 parts by mass, and more preferably in an amount of 0.01 to 3.0 parts by mass, with respect to 100 parts by mass of the component (A). When the amount of the component (B) is 0.01 part by mass or more, anaerobic curability can be exhibited. When the amount of the component (B) is 5.0 parts by mass or less, storage stability can be maintained.

The component (C) is a photoacid generator. The photoacid generator may be a compound that generates acid by irradiation with energy rays. By adding the component (C), irradiation with energy rays triggers the curing when a predetermined time is reached, although the mechanism is not clear. Since the irradiated portion is finally cured, if it is irradiated in an irradiation region wider than a coating region, the delayed curable composition that protrudes after the adherends are bonded to each other can also be cured. On the other hand, in the anaerobic curable composition essentially containing the component (A), the component (B), and organic peroxide described later, uncured areas occur in a region where the composition protrudes out of the adherend and are not in contact with the metal, resulting in decrease in adhesive strength.

Specific examples of the component (C) include salts whose cation species are iodonium-based cation species, sulfonium-based cation species, and the like, and whose anion species are phosphorus-based anion species, boron-based anion species, and the like, which can be used in combination of one type or two or more types. In addition, a nonionic photoacid generator can also be used. In addition, examples of the component (C) other than the salt include, but are not limited to, a diazomethane derivative, a triazine derivative, an imidyl sulfonate derivative, and the like. Specific examples thereof include, but are not limited to, haloalkyltriazinylaryl such as 1-methoxy-4-(3,5-di(trichloromethyl) triazinyl) benzene, 1-methoxy-4-(3,5-di(trichloromethyl) triazinyl) naphthalene, and the like, 1-methoxy-4-[2-(3,5-ditrichloromethyltriazinyl) ethenyl] benzene, 1,2-dimethoxy-4-[2-(3,5-ditrichloromethyltriazinyl) ethenyl] benzene, 1-methoxy-2-[2-(3,5-ditrichloromethyltriazinyl) ethenyl] benzene, succinimidyl camphor sulfonate, succinimidyl phenyl sulfonate, succinimidyl toluyl sulfonate, succinimidyl trifluoromethyl sulfonate, phthalimidyl trifluorosulfonate, naphthalimidyl camphor sulfonate, naphthalimidyl methanesulfonate, naphthalimidyl trifluoromethane sulfonate, naphthalimidyl toluyl sulfonate, and norbornene imidazole trifluoromethane sulfonate, and the like. Further, from the viewpoint of handling, the component (C) may be used in a state of being dissolved in a solvent such as propylene carbonate.

As one of the sulfonium salts, a compound represented by the following Formula 2 can be mentioned. Here, examples of R⁻ in the Formula 2 include anions such as hexafluoroantimonate, tetrafluoroborate, hexafluorophosphate, hexafluoroarsenate, hexachloroantimonate, trifluoromethane sulphonate ion, fluorosulphonate ion, and the like.

[Chemical Formula 2]

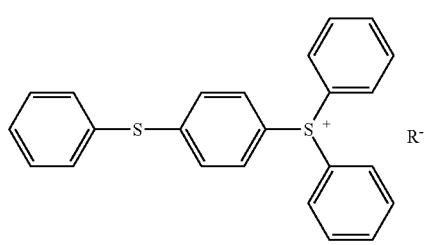

Formula 2

Specific examples of the component (C) include, but are not limited to, CPI-100P, CPI-101P, CPI-110B, CPI-200K, CPI-210S, IK-1, IK-2, and the like, which are available from San-Apro Ltd.; WPI-113, WPI-116, WPI-169, WPI-170, WPAG-336, WPAG-367, WPAG-370, WPAG-469, WPAG-638, and the like, which are available from FUJIFILM Wako Pure Chemical Corporation; SP-103, SP-150, SP-151, SP-170, SP-171, SP-172, and the like, which are available from ADEKA Corporation; CD-1010, CD-1011, CD-1012, and the like, which are available from SARTOMER; and SAN-AID SI-60, SI-80, SI-100, SI-60L, SI-80L, SI-100L, SI-L145, SI-L150, SI-L160, SI-L110, SI-L147, and the like, which are available from Sanshin Chemical Industry Co., Ltd.

It is preferable that 0.001 to 5.0 parts by mass of the component (C) is added with respect to 100 parts by mass of the component (A). When the amount of the component (C) is 0.001 part by mass or more, delayed curability can be exhibited. When the amount of the component (C) is 5.0 parts by mass or less, storage stability can be maintained.

An organic peroxide can be added as a compound for accelerating curing of the delayed curable composition. Particularly preferred is hydroperoxide. Specific examples thereof include, but are not limited to, p-menthane hydroperoxide, diisopropyl benzene hydroperoxide, 1,1,3,3-tetramethyl butyl hydroperoxide, cumene hydroperoxide, t-butyl hydroperoxide, and the like.

The organic peroxide is preferably added in an amount of 0.01 to 5.0 parts by mass, and more preferably in an amount of 0.1 to 3.0 parts by mass, with respect to 100 parts by mass of the component (A). When the amount of the organic peroxide added is 0.1 part by mass or more, anaerobic curability can be exhibited. When the amount of the organic peroxide added is 5.0 parts by mass or less, storage stability can be maintained.

As a compound for accelerating curing of the delayed curable composition, a curing accelerator can be added within a range that does not impair storage stability. Specific examples thereof include, but are not limited to, tertiary amines such as N,N-dimethylaniline, N,N-dimethyl-p-toluidine, diisopropanol-p-toluidine, triethylamine, and the like, polyamines such as diethylenetriamine, triethylenetetramine, pentaethylenehexamine, and the like, thioureas such as thiourea, ethylenethiourea, benzoylthiourea, acetylthiourea, tetramethylthiourea, and the like.

It is preferable that 0.01 to 5.0 parts by mass of the curing accelerator is added with respect to 100 parts by mass of the component (A). When the amount of the curing accelerator added is 0.01 part by mass or more, anaerobic curability can be improved. When the amount of the curing accelerator added is 5.0 parts by mass or less, storage stability can be maintained.

In the delayed curable composition, a chelating agent may be added for the purpose of improving storage stability. The chelating agent is a compound that coordinates with a metal ion, which is an impurity in the delayed curable composition, to chelate the metal to make it inactive, and suppress reactivity in the delayed curable composition. Therefore, the chelating agent allows the delayed curable composition to maintain storage stability.

Specific examples of the chelating agent that is solid at 25° C. include, but are not limited to, EDTA.2Na, EDTA.4Na, which are available from Dojindo Molecular Technologies, Inc., an EDTA-based (ethylenediaminetetraacetic acid) compound, a NTA-based (nitrilotetraacetic acid) compound, a DTPA-based (diethylenetriamine pentaacetic acid) compound, a HEDTA-based (hydroxyethylethylenediaminetriacetic acid) compound, a TTHA-based (triethylenetetramine hexaacetic acid) compound, a PDTA-based (1,3-propanediaminetetraacetic acid), a DPTA-OH-based (1,3-diamino-2-hydroxypropanetetraacetic acid) compound, a HIDA-based (hydroxyethyliminodiacetic acid) compound, a DREG-based (dihydroxyethylglycine) compound, a GEDTA-based (glycol ether diamine tetraacetic acid) compound, a CMGA-based (dicarboxymethylglutamate) compound, an EDDS-based ((S,S)-ethylenediamine disuccinic acid) compound, an EDTMP-based (ethylenediaminetetra(methylenephosphonic acid)) compound, and the like, which are available from Chelest Corporation. Further, specific examples of the chelating agent that is liquid at 25° C. include, but are not limited to, MZ-8, a HEDP-based (1-hydroxyethane-1,1-diphosphonic acid) compound, a NTMP-based (nitrilotris(methylenephosphonic acid)) compound, a PBTC-based (2-phosphono-1,2,4-butanetricarboxylic acid) compound, and the like, which are available from Chelest Corporation.

A concentration of the chelating agent in the component (A) is preferably 0.01 to 5.0% by mass. When the concentration of the chelating agent is 0.01% by mass or more, anaerobic curability can be improved. When the concentration of the chelating agent is 5.0% by mass or less, anaerobic curability can be improved and storage stability can be maintained.

In the delayed curable composition, a polymerization inhibitor can be added in order to further suppress change in viscosity with time. Specific examples thereof include, but are not limited to, 2,6-di-t-butyl-4-methylphenol, tetrahydroquinone, hydroquinone monomethyl ether, 4-t-butylcatechol, and the like. A concentration of the polymerization inhibitor in the component (A) is preferably 0.01 to 5.0% by mass. When the concentration of the polymerization inhibitor is 0.01% by mass or more, anaerobic curability can be improved. When the concentration of the polymerization inhibitor is 5.0% by mass or less, anaerobic curability can be improved and the storage stability can be maintained.

In addition, an antioxidant may be added depending on the purpose. Specific examples thereof include, but are not limited to, a phenol-based antioxidant, a thioether-based antioxidant, a phosphorus-based antioxidant, a nitroxide-based antioxidant, and the like.

A filler such as an inorganic filler or an organic filler can be appropriately added to the delayed curable composition. By adding a filler, not only viscosity and thixotropy but also curability and toughness can be adjusted. Examples of the inorganic filler include, but are not limited to, alumina, silica and the like.

Examples of the organic filler include, but are not limited to, a styrene filler, a rubber filler formed of acrylic rubber, polybutadiene rubber, or the like, a rubber filler having a core-shell structure, and the like. A particularly preferable inorganic filler is fumed silica. Examples of the fumed silica include, but are not limited to, a hydrophilic type in which silanol remains on the surface, a hydrophobic type in which the silanol is treated with dimethyldichlorosilane or the like to make the silica surface hydrophobic, and the like. Specific examples of the hydrophilic type product include AEROSIL (registered trademark) (Aerosil) 90, 130, 150, 200, 255, 300, 380, and the like, which are available from Nippon Aerosil Co., Ltd. Specific examples of the hydrophobic type product include AEROSIL (registered trademark) (Aerosil) R972 (dimethyldichlorosilane treatment), R974 (dimethyldichlorosilane treatment), R104 (octamethylcyclotetrasiloxane treatment), R106 (octamethylcyclotetrasiloxane treatment), R202 (polydimethylsiloxane treatment), R805 (octylsilane treatment), R812 (hexamethyldisilazane treatment), R816 (hexadecylsilane treatment), R711 (methacrylic silane treatment), and the like, which are available from Nippon Aerosil Co., Ltd. In addition, fumed silica, CAB-O-SIL (registered trademark) (Cabosil) series, available from Cabot Corporation, and the like can be mentioned.

In order to adjust properties of the delayed curable composition and properties of the cured material, additives such as a photosensitizer, a silane-based coupling agent, a titanium-based coupling agent, a leveling agent, an antiaging agent, a plasticizer, and a solvent may be blended to the extent that the physical are not impaired.

As a method for curing the delayed curable composition, a curing method which comprises applying a delayed curable composition to one adherend and then irradiating the delayed curable composition with energy rays to adhere the adherend to another adherend, as illustrated in FIG. 1, a curing method which comprises irradiating a delayed curable composition with energy rays, and then applying the delayed curable composition to one adherend to adhere two adherends, as illustrated in FIG. 2, and the like may be mentioned, but is not limited to. Further, the adherend is preferably metal such as iron that activates anaerobic curability, but is not limited thereto.

In the manufacturing method of the present invention, a primer composition containing a compound that accelerates curing of the delayed curable composition such as an organometallic complex or an amine compound can also be used as long as the effect(s) be not impaired. As a result, it can be cured in a shorter time. Specific examples thereof include, but are not limited to, a method for applying the primer composition to the belt-shaped thin steel sheet on the side opposite to the coating side of the curable composition, and a method for adding a curing accelerator to the processing oil.

In the manufacturing method of the present invention, the laminated steel sheet 10 can also be heated in order to accelerate the curing of the delayed curable composition between the laminated steel sheets 10 obtained within a range in which the effect(s) is not impaired. A heat source in the method for manufacturing a laminated steel sheet which comprises the above-mentioned heating method is not particularly limited, and examples thereof include a hot air drying furnace, a belt conveyor type IR furnace (infrared heating furnace), and the like. A temperature and a time for heating may be any conditions that allow sufficient curing. For example, it is appropriate to heat under the conditions of the temperature of 40 to 300° C., and preferably 60 to 200° C., and the time of 10 seconds to 3 hours, and preferably 20 seconds to 60 minutes. When heating the laminated steel sheet, it is preferable to fix the laminated steel sheet with a fixing jig or the like in advance so that positional deviation can be prevented.

The present invention is not limited to the above-described embodiments, and for example, an embodiment applied to a manufacturing method of a laminated steel sheet for a rotor of a rotary electric machine or a solenoid, a laminating metallic die, or the like, may be used.

EXAMPLES

Next, the present invention will be described in more detail with reference to examples, but the present invention is not limited to these examples.

Reference Examples 1 to 15

The following components were provided to prepare a delayed curable composition. (Hereinafter, the delayed curable composition is also simply referable to as a composition).

Anaerobic curable composition containing component (A): a compound having a (meth)acryloyl group, component (B): an anaerobic curable catalyst, and organic peroxide
- ThreeBond1305N (Anaerobic sealant available from ThreeBond Co., Ltd.)
- ThreeBond1307N (Anaerobic sealant available from ThreeBond Co., Ltd.)
- ThreeBond1314 (anaerobic sealant available from ThreeBond Co., Ltd.)
- ThreeBond1327 (anaerobic sealant available from ThreeBond Co., Ltd.)
- ThreeBond1360F (Anaerobic sealant available from ThreeBond Co., Ltd.)
- (Hereafter, ThreeBond is abbreviated as TB.).

Component (C): Photoacid generator
- In the Formula 2, R⁻ is a salt of hexafluorophosphate (50% by mass (solid content) of propylene carbonate solution) (CPI-100P available from San-Apro Ltd.)
- In the Formula 2, R⁻ is a salt of phosphorus-based anion species (50% by mass (solid content) of propylene carbonate solution) (CPI-200K available from San-Apro Ltd.)

TB1305N, TB1307N, TB1314, TB1327, and TB1360F were weighed in a stirring pot, respectively. Next, the component (C) was weighed in a stirrer and stirred for minutes. The detailed preparation amounts are indicated in Table 1, and all numerical values are expressed in parts by mass. The stirrer used in the examples is a type in which the stirring pot can be removed. Therefore, the stirring pot can be used as a measuring instrument by resetting a weight and then adding the raw materials for weighing.

Set time measurements were performed for Reference Examples 1 to 15. The results are summarized in Table 1.

[Bolt Set Time Measurement]

Iron M10, P1.5×20 mm hex bolt (JIS B1180) and M10, and P1.5 hex nut were used. The composition was added to a polycap to a depth of 1 mm, and irradiated with a spot irradiator equipped with a high-pressure mercury lamp at four types of integrated light intensity, 0 (unirradiated), 1, 10, and 30 kJ/m², respectively. A case where the composition that remains liquid (uncured) immediately after irradiation moves to the set time measurement described later. A case where the composition is partially cured is described as "semi-cured". A case where the whole composition is cured is described as "cured". A case of not being implemented is described as "-". For the composition that remained liquid, the composition was immediately applied around a male screw 10 mm from the tip of the male screw portion of the bolt at 6 points at equal intervals, and then the nut was screwed onto the bolt. After that, every one minute, whether or not the nut is fixed was checked by being turned with a finger, and if the fixing was not confirmed even after 10 minutes, checking was performed every 10 minutes, and the time when the nut was fixed was described as "bolt set time (minutes)". Here, if the setting (fixing) was not confirmed even after 60 minutes, it was described as "more than 60".

TABLE 1

| Component | Raw material | | Reference Example 1 | Reference Example 2 | Reference Example 3 | Reference Example 4 | Reference Example 5 |
|---|---|---|---|---|---|---|---|
| Anaerobic curable composition containing component (A), component (B), and organic peroxide | TB1305N | | 100 | | | | |
| | TB1307N | | | 100 | | | |
| | TB1314 | | | | 100 | | |
| | TB1327 | | | | | 100 | |
| | TB1360F | | | | | | 100 |
| Component (C) | CPI-100P | | 0.5 | 0.5 | 0.5 | 0.5 | 0.5 |
| | CPI-200K | | | | | | |
| Total | | | 100.5 | 100.5 | 100.5 | 100.5 | 100.5 |
| Bolt set time | Integrated light intensity | 0 | 8 | 4 | 8 | More than 60 | 29 |
| | | 1 | 7 | 2 | 4 | 14 | 5 |
| | | 10 | 4 | Semi-cured | 3 | Semi-cured | Semi-cured |
| | | 30 | Semi-cured | — | Semi-cured | — | — |

| Component | Raw material | | Reference Example 6 | Reference Example 7 | Reference Example 8 | Reference Example 9 | Reference Example 10 |
|---|---|---|---|---|---|---|---|
| Anaerobic curable composition containing component (A), component (B), and organic peroxide | TB1305N | | 100 | | | | |
| | TB1307N | | | 100 | | | |
| | TB1314 | | | | 100 | | |
| | TB1327 | | | | | 100 | |
| | TB1360F | | | | | | 100 |
| Component (C) | CPI-100P | | 1.0 | 1.0 | 1.0 | 1.0 | 1.0 |
| | CPI-200K | | | | | | |
| Total | | | 101.0 | 101.0 | 101.0 | 101.0 | 101.0 |
| Bolt set time | Integrated light intensity | 0 | 8 | 4 | 8 | More than 60 | 29 |
| | | 1 | 4 | 3 | 3 | 8 | 6 |
| | | 10 | Semi-cured | Cured | Semi-cured | Cured | Cured |
| | | 30 | — | — | — | — | — |

| Component | Raw material | Reference Example 11 | Reference Example 12 | Reference Example 13 | Reference Example 14 | Reference Example 15 |
|---|---|---|---|---|---|---|
| Anaerobic curable composition containing component (A) | TB1305N | 100 | | | | |
| | TB1307N | | 100 | | | |
| | TB1314 | | | 100 | | |

TABLE 1-continued

| component (B), and organic peroxide | TB1327 | | | | | 100 | |
|---|---|---|---|---|---|---|---|
| | TB1360F | | | | | | 100 |
| Component (C) | CPI-100P | | | | | | |
| | CPI-200K | | 0.5 | 0.5 | 0.5 | 0.5 | 0.5 |
| Total | | | 100.5 | 100.5 | 100.5 | 100.5 | 100.5 |
| Bolt set time | Integrated light intensity | 0 | 8 | 4 | 8 | More than 60 | 29 |
| | | 1 | 7 | 3 | 4 | 9 | 8 |
| | | 10 | 5 | 2 | 3 | Semi-cured | Semi-cured |
| | | 30 | Semi-cured | Semi-cured | Semi-cured | — | — |

In Reference Examples 1 to 15, a case where the integrated light intensity is 0 kJ/m$^2$ that means to be not irradiated (non-irradiated) indicates that the composition is cured only by the anaerobic curability imparted by the composition formed of the component (A), the component (B), and the organic peroxide. On the other hand, it is noted that the set time gradually increases when the integrated light intensity is 1, 10, and 30 kJ/m$^2$. Although not clearly clarified, it is presumed that this is due to the addition of the component (C) and the activation of the component (C) by irradiation with energy rays. The anaerobic curable composition begins to cure when it comes into contact with metal; however, in the manufacturing process of the laminated steel sheet, a processing oil remains on the metal surface of the adherend, which makes uncertain that the anaerobic curable composition comes into contact with the metal, to disperse adhesive strength. On the other hand, even when the anaerobic curable composition and the primer for the anaerobic curable composition are used, the primer may be biased depending on how the primer is applied, which disperses adhesive strength. In the delayed curable composition, even if it does not necessarily come into contact with a metal and a primer is not used, it is delayed cured by light irradiation, to improve adhesive strength and decrease variation.

Reference Examples 16 and 17

The following components were provided to prepare a delayed curable composition.
Component (A): a compound having a (meth)acryloyl group
2,2-bis[4-(methacryloxyethoxy) phenyl] propane (EO 2.3 mols) (NK ESTER BPE-80N available from Shin-Nakamura Chemical Co., Ltd.)
Isobornyl methacrylate (LIGHT ESTER IB-X available from Kyoeisha Chemical Co., Ltd.)
2-hydroxyethyl methacrylate (LIGHT ESTER HO, available from Kyoeisha Chemical Co., Ltd.)
Component (B): Anaerobic curable catalyst
Saccharin (reagent)
Component (C): Photoacid generator
In the Formula 2, R$^-$ is a salt of hexafluorophosphate (50% by mass (solid content) of propylene carbonate solution) (CPI-100P available from San-Apro Ltd.)
Other components
Tetrahydroquinone (reagent)
Ethylenediamine-N,N,N',N'-disodium tetraacetate dihydrate (solid at 25° C.) (2NA (EDTA.2Na) available from Dojindo Molecular Technologies, Inc.).

The components (A) and (B), and other components were weighed in a stirring pot. Next, the component (C) was weighed in a stirrer and stirred for 60 minutes. The detailed preparation amounts are indicated in Table 2, and all numerical values are expressed in parts by mass.

Glass set time measurements were performed for Reference Examples 16 and 17. The results are summarized in Table 2.

[Glass Set Time Measurement]

Two glass sheets with a length of 76 mm, a width of mm, and a thickness of 1 mm were used. The composition was added to a polycap to a depth of 1 mm, and irradiated with a spot irradiator equipped with a high-pressure mercury lamp at two types of integrated light intensity, 0 (unirradiated) and 1 kJ/m$^2$, respectively. The composition that remains liquid was immediately applied to one glass sheet at 0.02 g, and the other glass sheet was bonded thereto in a cross shape with an area of 26 mm×26 mm. After that, every one minute, whether or not the glass sheets are fixed was checked by being turned with a finger, and if the fixing was not confirmed even after 10 minutes, checking was performed every 10 minutes, and the time when the glass sheets were fixed is described as "glass set time (minutes)". Here, if the setting (fixing) was not confirmed even after 60 minutes, it was described as "more than 60".

TABLE 2

| Component | Raw material | | Reference Example 16 | Reference Example 17 |
|---|---|---|---|---|
| Component (A) | BPE-80N | | 70 | 70 |
| | IB-X | | 15 | 15 |
| | HO | | 15 | 15 |
| Component (B) | Saccharin | | 1.0 | |
| Component (C) | CPI-100P | | 0.5 | 0.5 |
| Polymerization inhibitor | Tetrahydroquinone | | 0.2 | 0.2 |
| Chelating agent | 2NA | | 0.02 | 0.02 |
| Total | | | 101.72 | 100.72 |
| Glass set time | Integrated light intensity | 0 | More than 60 | More than 60 |
| | | 1 | 8 | More than 60 |

In Reference Examples 16 and 17, the presence or absence of the component (B) is checked in the composition containing the component (A) and the component (C). In Reference Example 16 which contains saccharin as the component (B), it is noted that the glass sheets are adhered by irradiating with energy rays even if the adherend is not metal. On the other hand, in Reference Example 17 which does not contain the component (B), it is noted that it cannot be cured even by irradiation with energy rays.

INDUSTRIAL APPLICABILITY

Since a laminated steel sheet can be stably produced by the manufacturing method of the present invention, it is possible to manufacture a high-performance laminated steel sheet with high adhesive strength, with improved yield and secured working time with the delayed curable composition. In particular, it is not necessary to use a primer composition, and there is little variation in adhesive strength.

This application is based on Japanese Patent Application No. 2018-236173 filed on Dec. 18, 2018, the disclosure of which is incorporated in its entirety by reference.

REFERENCE SIGNS LIST

1 Roll device,
2 Belt-shaped thin steel sheet,
3 Processing oil applicator,
4 Metallic die machine,
5 Punch portion,
6 Curable composition applicator,
7 Curable composition supply device,
8 Irradiator,
9 Blanking punch portion,
10 Laminated steel sheet,
11 Punched hole,
100, 200 Apparatus for manufacturing a laminated steel sheet.

The invention claimed is:

1. A method for manufacturing a laminated steel sheet comprising a predetermined number of thin steel sheets formed by punching a belt-shaped thin steel sheet into a predetermined shape, the method for manufacturing the laminated steel sheet comprising:

sequentially punching the belt-shaped thin steel sheet into the predetermined shape with a metallic die to form the thin steel sheets;

applying a curable composition to a predetermined portion of the thin steel sheets;

irradiating the curable composition with energy rays;

laminating the thin steel sheets on which the curable composition has been applied and irradiated; and fixing the laminated thin steel sheets for a predetermined time after the laminating, wherein the curable composition is a delayed curable composition which is cured after a lapse of a predetermined time after being irradiated with the energy rays, and wherein the sequentially punching, the applying, the irradiating, the laminating, and the fixing are performed in this order.

2. The method for manufacturing a laminated steel sheet according to claim 1, wherein the metallic die hits a front surface of the belt-shaped thin steel sheet, and the curable composition is applied to a back surface of the belt-shaped thin steel sheet.

3. The method for manufacturing a laminated steel sheet according to claim 2, further comprising:

applying a processing oil to the front surface of the belt-shaped thin steel sheet before the sequentially punching.

4. The method for manufacturing a laminated steel sheet according to claim 1, wherein the curable composition contains the following components (A) to (C):

component (A): a compound having a (meth)acryloyl group;

component (B): an anaerobic curable catalyst; and component (C): a photoacid generator.

* * * * *